April 6, 1943.   B. E. STEWART   2,315,746
ELECTRICAL CONNECTION BOX
Filed Oct. 2, 1940
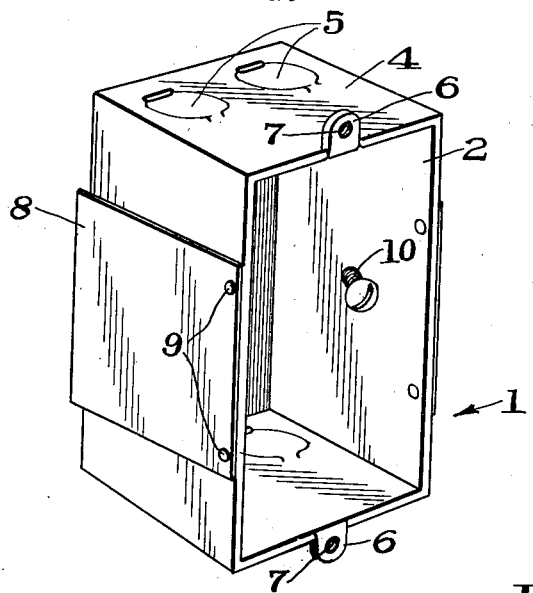
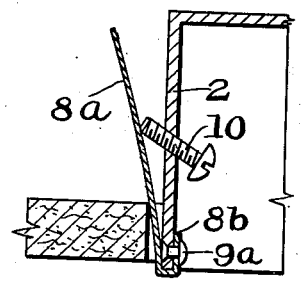
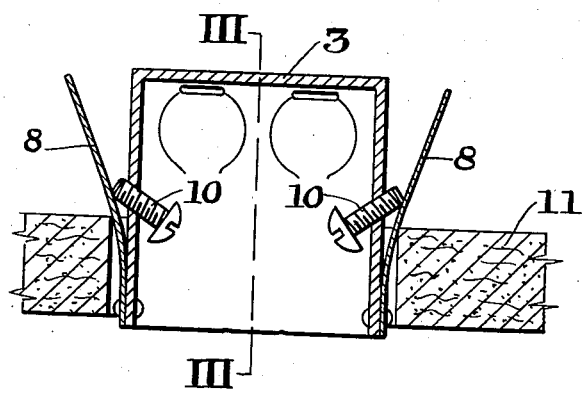
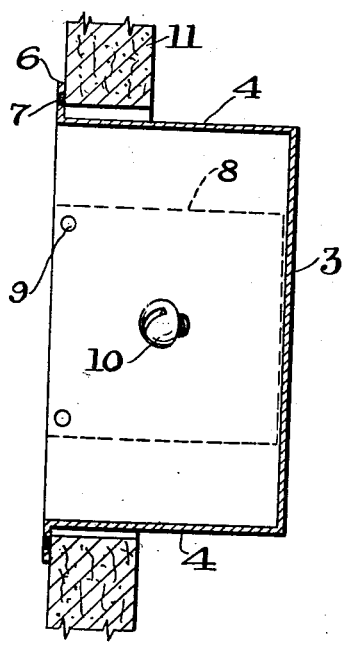
Inventor
BURNS E. STEWART
By W. S. McDowell
Attorney Patented Apr. 6, 1943

2,315,746

UNITED STATES PATENT OFFICE 2,315,746

ELECTRICAL CONNECTION BOX

Burns E. Stewart, Columbus, Ohio, assignor of one-half to John Flesch, Columbus, Ohio Application October 2, 1940, Serial No. 359,367

4 Claims. (Cl. 220—3.6)

This invention relates generally to electrical supplies and is more specifically directed to improvements in connection boxes of the type usually disposed in a building wall to receive switches, sockets or other outlets.

At the present time, most of such outlet connection boxes are provided with laterally directed ears or attaching plates in which openings are formed for the reception of screws employed to secure the box to the wall. Frequently the connection boxes are disposed in such positions that the screws extend through plaster only and when tightened or adjusted do not obtain the proper purchase and therefore do not firmly secure the boxes to the wall. Also, in certain instances in building construction, composition materials are employed either for the complete wall or as a substitute for the lathing. This material is ordinarily soft and fibrous and when screws are driven into it, weak threads are formed which are not of sufficient strength to hold the connection box with the result that these members become loosened.

The primary object of the invention resides in the provision of means for securing connection boxes in openings in building walls without requiring screws or nails to be driven into the walls, thus avoiding the objections, above noted, to the present method of attaching such connection boxes.

Another object resides in the formation of a connection box with a pair of flexible wing plates at the sides and providing the box with means for adjusting wing plates to cause them to move laterally and engage the sides of the opening for the box whereby this member will be firmly supported in the wall.

A further object rests in providing a connection box with a pair of rigid ears or lugs to engage the wall surface and a pair of flexible wings which in their normal positions are parallel with the sides of the box and extend into the wall opening, the box also being provided with adjusting screws by means of which the wings may be flexed to cause a wedge-like engagement with the sides of the wall opening whereby the box will tend to move into the opening, thus drawing the previously mentioned ears into rigid engagement with the wall and clamping the box securely in place.

Another object rests in extending the openings for the wing adjusting screws through the side walls of the box on an angle in order to place the screw heads in such positions that they will be accessible from the open front of the box.

A more complete understanding of the invention may be had by reference to the following description and the accompanying drawing in which a connection box formed in accordance with the present invention has been illustrated in detail.

In the drawing:

Fig. 1 is a perspective view of a connection box embodying the principles of the invention;

Fig. 2 is a horizontal sectional view taken through the box and showing the same installed in a building wall;

Fig. 3 is a vertical sectional view taken through the box on the plane indicated by the line III—III of Fig. 2.

Fig. 4 is a fragmental horizontal sectional view illustrating a modification.

Referring more particularly to the drawing, the numeral 1 designates the connection box in its entirety. This box is of the usual form and includes a body having side, rear and end walls 2, 3 and 4 respectively. This box is ordinarily formed of sheet metal bent into box forming order. In some instances, the box is also formed of cast iron. The materials and shape of the box have no bearing on the present invention which is particularly directed to the means and manner of securing the box in a building wall.

One or more of the walls of the body are provided with weakened areas 5, the removal of which provide openings for the reception of cable sheaths or conduits. A pair of opposed end walls, 4 in this instance, are provided with laterally directed lugs 6 which project from the body in a plane substantially parallel with the front of the body. These ears are formed with threaded openings 7 to receive screws employed in fastening switches, outlets or other electrical devices within the box. These ears also engage the edges of the opening in which the connection box is positioned to limit the degree of movement of the box into the opening.

To secure the box in position, the side walls 2 have flat wing plates 8 fastened to the forward edges of the walls by rivets or other means 9. This method of fastening the plates to the box permits the free or rear edges of the plates to swing toward and away from the body. Preferably, the plates 8 are formed of spring steel or similar material possessing considerable resiliency.

In registration with the plates, the side walls 2 are provided with adjusting screws 10, these being simple machine screws of the round head type. The openings through which the screws extend have their longitudinal axes disposed at angles less than 90 degrees to the walls through which they extend so that a screw driver may be engaged with the screw heads through the open front of the box. As the screws are adjusted or threaded into the wall openings, the ends of the screws will engage the wing plates and force them outwardly away from the connection box into the position shown in Fig. 2. After the wings have moved a sufficient distance, they will engage the rear edges of the opening formed in the building wall 11 and continued movement of the screws will exert pressure on the edges of the opening. The reaction of this pressure will hold the box firmly in position.

By reason of the flexibility of the wings 8, they will assume a wedge-like form when the screws are adjusted to force them outwardly. This wedge-like shape will tend to move the box further into the opening but since the lugs 6 are disposed in engagement with the front surface of the wall, this inward movement will be precluded and the box firmly secured or clamped to the wall.

Due to the construction of the box and the wing plates, the body may be positioned in openings formed in walls having greater thickness than the depth of the box, the free edges of the wing plates then engaging the side walls of the opening to clamp the box in place.

It is obvious that although the invention has been illustrated in connection with an electrical outlet box, the size and shape of the box might be changed to adapt it to any desirable use, or the method of securing it in the wall opening might be employed with other articles, for example, medicine cabinets, wall safes and similar members.

As illustrated in Fig. 4, the manner of securing the flexible wings may be varied from the first form shown, one instance being to provide the wing 8a with a rearwardly directed lip 8b which will overhang the forward edge of the side wall 2. The rivets 9a extend through the side wall 2 and the lip 8b only, to hold the wing on the box and yet permit the wing to flex throughout its full length from the edge of the side wall to the rear end of the wing. By this method of attachment, the box or other article may be secured to a wall formed from relatively thin material.

While the invention has been illustrated in but a single form, many minor changes may be made in the construction and relation of parts without departing from the spirit and scope of the invention as set forth in the following claims.

What is claimed is:

1. An electrical connection box comprising a metallic box-like body having side and end walls, lug means disposed at the forward edges of said end walls and projecting away from said body, relatively flexible flat wing plates disposed in parallel relation with and rigidly connected to said side walls adjacent to the forward portions, said plates projecting toward the rear of said body, and adjustable means carried by said body in registration with said wing plates, operation of said adjustable means serving to flex said plates to swing the free edges thereof toward and away from said body.

2. An electrical connection box comprising a metallic box-like body having side and end walls, lug means disposed at the forward edges of said end walls and projecting away from said body, relatively flexible flat wing plates connected to said side walls adjacent to the forward portions, said plates projecting toward the rear of said body, and screw means extending through said side walls in registration with said wing plates, movement of said screw means through said walls serving to flex said plates and swing the rear edges away from said body.

3. An electrical connection box comprising a fireproof body having side and end walls, lug means projecting laterally from certain of said walls, a flat spring-like plate rigidly secured at one edge to the forward edge of each of a pair of opposed walls, and adjustable means accessible from the front of the box for flexing said plate to swing the free edges thereof away from the body.

4. An electrical connection box comprising a metallic box-like body having side and end walls, lug means disposed at the forward edges of said end walls and projecting away from said body, relatively flexible flat wing plates connected to said side walls adjacent to the forward portions, said plates projecting toward the rear of said body, and screw means extending angularly through said side walls in registration with said wing plates, movement of said screw means through said walls serving to flex said plates and swing the rear edges away from said body, the angular arrangement of said screw means serving to make them accessible from the front of said body.

BURNS E. STEWART.